US012021928B2

(12) United States Patent
De et al.

(10) Patent No.: US 12,021,928 B2
(45) Date of Patent: Jun. 25, 2024

(54) SYSTEM AND METHOD FOR OPTIMIZING DATA TRANSMISSION IN A COMMUNICATION NETWORK

(71) Applicant: INDIAN INSTITUTE OF TECHNOLOGY DELHI, New Delhi (IN)

(72) Inventors: Swades De, New Delhi (IN); Akash Kumar Mandal, New Delhi (IN); Varun Gupta, New Delhi (IN); Rushang Gupta, New Delhi (IN)

(73) Assignee: Indian Institute of Technology Delhi, New Delhi (IN)

( * ) Notice: Subject to any disclaimer, the term of this patent is extended or adjusted under 35 U.S.C. 154(b) by 67 days.

(21) Appl. No.: 17/948,969

(22) Filed: Sep. 20, 2022

(65) Prior Publication Data
US 2023/0116246 A1    Apr. 13, 2023

(51) Int. Cl.
*H04L 12/70*       (2013.01)
*G06N 20/10*       (2019.01)
(Continued)

(52) U.S. Cl.
CPC .............. *H04L 67/12* (2013.01); *G06N 20/10* (2019.01); *H04L 43/028* (2013.01)

(58) Field of Classification Search
CPC ... H04L 67/12; H04L 43/028; H04L 41/0823; H04L 41/16; H04L 43/50; G06N 20/10; H04W 4/70
(Continued)

(56) References Cited

U.S. PATENT DOCUMENTS

| 2003/0130855 | A1* | 7/2003 | Babu | H03M 7/30 |
| | | | | 704/500 |
| 2005/0261837 | A1* | 11/2005 | Wegerich | G06N 5/025 |
| | | | | 702/19 |

(Continued)

FOREIGN PATENT DOCUMENTS

| CN | 102708404 A | * | 2/2012 | ............. G06N 3/08 |
| CN | 103745130 A | * | 1/2014 | ............. G06F 19/00 |

(Continued)

*Primary Examiner* — Ario Etienne
*Assistant Examiner* — Elizabeth Kassa
(74) *Attorney, Agent, or Firm* — GREENBERG TRAURIG, LLP (57) ABSTRACT

Disclosed are system (100) and method (300) for optimizing data transmission in communication network. System comprises Internet of Thing (IoT) device node (102) having sensors for capturing sensor data and controller (106) configured at the IoT device node for constructing set of attributes from the sensor data, such that each set of attribute comprises sensor data based on correlation. Support Vector Regression (SVR) models for pruning the sensor data at IoT device node (102) is defined. Values for each attribute in set of attributes predicted based on predicting run-time errors in values according to the SVR models defined for each of base attribute and the non-base attribute. The run-time errors for each of base attributes and non-base attributes gets compared with threshold error values. The IoT device node (102) transmits either model parameters for attributes or training data along with the set of attributes by transceiver (108) to the data collector node (104).

14 Claims, 8 Drawing Sheets

(51) Int. Cl.
*H04L 43/028* (2022.01)
*H04L 67/12* (2022.01)

(58) Field of Classification Search
USPC .......................................... 709/201
See application file for complete search history.

(56) References Cited

U.S. PATENT DOCUMENTS

| | | | |
|---|---|---|---|
| 2009/0063115 A1* | 3/2009 | Lu ........................... | G06F 30/20 |
| | | | 703/8 |
| 2015/0371151 A1* | 12/2015 | Georgescu ............. | G06N 20/00 |
| | | | 706/12 |
| 2018/0276564 A1* | 9/2018 | Varma ..................... | G06F 17/16 |
| 2019/0251458 A1* | 8/2019 | Ravi ....................... | G06N 20/00 |
| 2021/0110313 A1* | 4/2021 | Jones ..................... | G06F 18/214 |
| 2021/0342836 A1* | 11/2021 | Cella ..................... | H04L 9/3239 |
| 2022/0159020 A1* | 5/2022 | Wang ..................... | H04L 43/062 |
| 2023/0028886 A1* | 1/2023 | Zhang .................... | G06N 20/10 |

FOREIGN PATENT DOCUMENTS

| | | | | |
|---|---|---|---|---|
| CN | 111444953 B | * | 3/2020 | ........... G06K 9/6256 |
| CN | 113205182 B | * | 9/2021 | ............. G06N 3/045 |

\* cited by examiner

SYSTEM AND METHOD FOR OPTIMIZING DATA TRANSMISSION IN A COMMUNICATION NETWORK

CROSS-REFERENCE TO RELATED APPLICATIONS AND PRIORITY

The present application claims benefit from Indian Patent Application No. 202111043813 filed on 27 Sep. 2021 the entirety of which is hereby incorporated by reference.

TECHNICAL FIELD

Embodiments of the present invention relate to the data transmission, more particularly to system and method for optimizing data transmission in a communication network.

BACKGROUND

Internet-of-things (IoT) networks are widely deployed for real-time monitoring systems and such systems generate huge volume of time critical data. IoT has the ability to aid real-time monitoring for decision-making, thereby making the IoT network highly suitable for time-critical deployments in many diverse fields. In the IoT infrastructure, the IoT devices constantly sample test system's data and transmit the sampled data over wireless communication channel to a local data collector (edge device).

Such communication strategy lacks in a few important aspects of efficient spectral usage and optimized data storage. Moreover, analyzing such a huge bulk of data is a strenuous task for the edge node, especially when there is a constraint of hardware computation. Further, existing infrastructure introduces significant computational delays, which are not suitable for time-critical processing frameworks and makes the whole process economically heavy. In addition, off-loading the tasks at multiple IoT device nodes or data collector nodes makes the data more susceptible to breaching.

The existing solutions to offload the tasks rely on pruning the IoT data, which eventually reduce the volume of information exchanged over the wireless link. Most of the solutions emphasize on data compression frameworks through statistical methods to compress offline or storage data. However, such solutions fail to address compression for the real time data exchanged over the wireless channel. Further, the storage data optimization fails because of the two major reasons in real-time smart IoT communication. One reason being addition to the processing time at the edge node and second is to make the data relayed over the noisy wireless channel, which is more susceptible to channel errors, by the virtue of its size.

Another solution so far known include use of a wavelet compression to compress and re-construct the transmitted data, which introduces significant delays in the system and incongruous to real-time smart IoT applications. Other techniques like principal component analysis and discrete cosine transform for compression of IoT data are not able to perform the compression in real-time and renders them inappropriate in delay-sensitive applications. Also, the approach of only transmitting the model parameters reduces the data redundancy significantly, leading to higher susceptibility of erroneous reconstruction at data collectors (edge device) in wireless data.

Further, other existing solutions, use machine learning based solutions using tools like SVR. However, their dependence on databases makes their scale of real-time sparse, unsuited to further delay-constraint applications. Others use SVR tools for data characterization only, which is insufficient for resource utility optimization in wireless communication scenarios. Furthermore, the coexistence of attribute grouping into base and non-base sets alongside multi-attribute data pruning is not proposed in any of the inventions, limiting their usage in high dimension real-time wireless data communication scenarios. Furthermore, other existing techniques fail to process on real-time data, data dimensionality reduction or pruning, and hence does not address the communication resource optimization.

BRIEF DESCRIPTION OF THE DRAWINGS

The foregoing summary, as well as the following detailed description of embodiments, is better understood when read in conjunction with the appended drawing. For the purpose of illustrating the disclosure, there is shown in the present document example constructions of the disclosure, however, the disclosure is not limited to the specific methods and apparatus disclosed in the document and the drawing.

The detailed description is described with reference to the accompanying figure. In the figure, the left-most digit(s) of a reference number identifies the figure in which the reference number first appears. The same numbers are used throughout the drawing to refer like features and components.

FIG. 7(*a*) illustrates a graphical representation of effective retraining count versus tolerance observed for the system of FIG. 1, in accordance with different embodiments of the invention;

FIG. 7(*b*) illustrates a graphical representation of effective retraining count versus training length observed for the system of FIG. 1, in accordance with different embodiments of the invention.

SUMMARY

Before the present system and method for optimizing data transmission in a communication network is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to the system and the method for optimizing data transmission in the communication network. This summary is not intended to identify essential features of the claimed subject matter nor is it intended for use in determining or limiting the scope of the claimed subject matter.

In one implementation, a system for optimizing data transmission in a communication network is disclosed. The system comprises an Internet of Thing (IoT) device node having sensors for capturing sensor data. The sensor data is exchanged between the IoT device and a data collector in the communication network. A controller configured at the IoT device node for constructing set of attributes from the sensor data, such that each set of attribute comprises sensor data based on correlation. Each set of attribute comprises a base attribute used for predicting non-base attributes from the set of attributes. The Support Vector Regression (SVR) models for pruning the sensor data at the IoT device node gets defined. An error bound E (tube width) is defined for limiting the run-time prediction errors in the SVR models' base attribute and non-base attribute while predicting values of the attributes in the set of attributes. In real time, values for each attribute in the set of attributes are predicted through the controller based on predicted run-time predicted errors in the base attribute and the non-base attribute. The predicted values are used as model parameters and initial samples of the values for each attribute is used as training data for training the SVR models for next predictions of the values of attributes In another implementation, a method for optimizing data transmission in a communication network is disclosed. Sensor data gets captured at an Internet of Thing (IoT) device node in the communication network. The sensor data is exchanged between the IoT device and a data collector. Thereafter, set of attributes gets constructed through a controller configured at the IoT node from the sensor data, such that each set of attribute comprises sensor data based on correlation. Each set of attribute comprises a base attribute used for predicting non-base attributes from the set of attributes. The Support Vector Regression (SVR) models for pruning the sensor data at the IoT device node gets defined. An error bound E (tube width) is defined for limiting run-time prediction errors in the SVR models' base attribute and non-base attribute while predicting values of the attributes in the set of attributes. In real time, values for each attribute in the set of attributes are predicted through the controller based on predicted run-time predicted errors in the base attribute and the non-base attribute. The predicted values are used as model parameters and initial samples of the values for each attribute is used as training data for training the SVR models for next predictions of the values of attributes.

DETAILED DESCRIPTION

Some embodiments of the present disclosure, illustrating all its features, will now be discussed in detail. The words "comprising", "receiving", "determining", "generating" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary system and method for optimizing data transmission in a communication network are now described. The disclosed embodiments of the system and the method for optimizing data transmission in the communication network are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for 3D storage the system and the method for optimizing data transmission in the communication network is not intended to be limited to the embodiments illustrated, but is to be accorded the widest scope consistent with the principles and features described herein.

Figure 1:
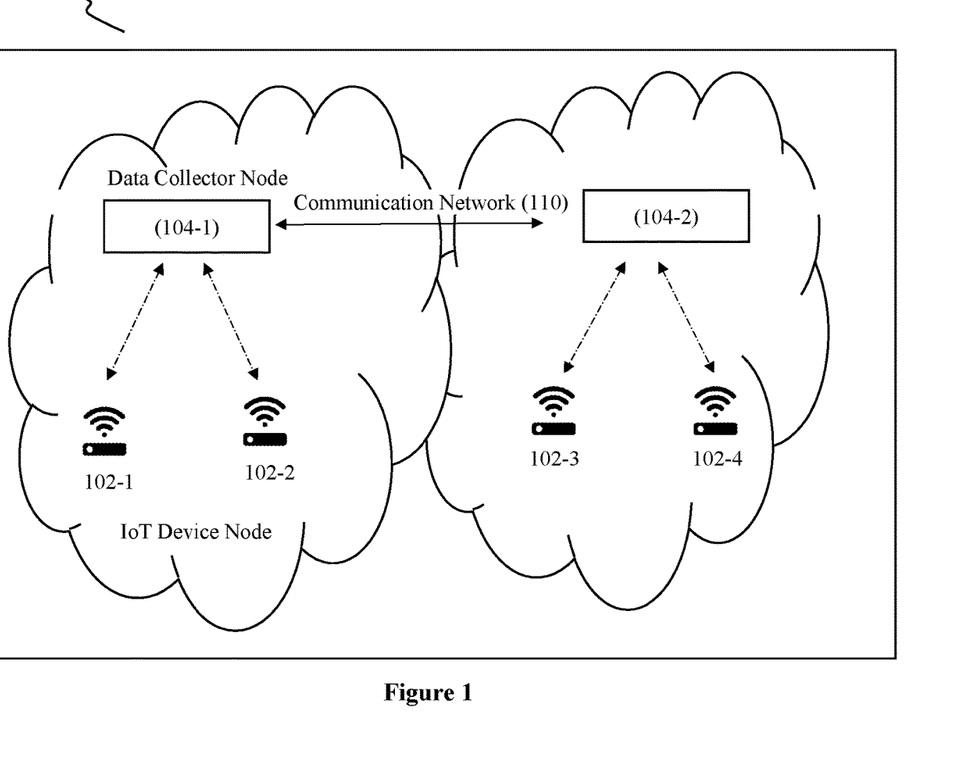
FIG. 1 illustrates a system for optimizing data transmission in a communication network, in accordance with different embodiments of the invention.
Figure 2A:
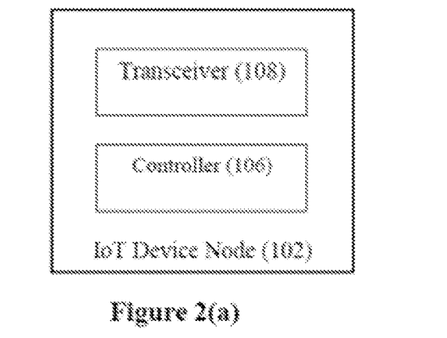
FIG. 2(a) illustrates an IoT device node block diagram, in accordance with different embodiments of the invention.

In reference to FIG. 1, a system (100) for optimizing data transmission in a communication network is shown. The system (100) comprises a plurality of Internet of Thing (IoT) device nodes (102: 102-1, 102-2, 102-3 . . . 102-*n*) (may also be referred as smart device nodes) having sensors for capturing sensor data. FIG. 2 (*a*) is showing block diagram of IoT device node (102). Now referring to FIG. 2(*a*) in combination with FIG. 1, the sensor data is exchanged between the IoT device node (102) and a plurality of data collector node (104: 104-1, 104-2, 104-3 . . . 104-*n*) in the communication network (110). A controller (106) is configured at the IoT device node (102) for constructing a set of attributes through a controller configured at the IoT node (102), from the sensor data. The controller (106) is further configured for defining Support Vector Regression (SVR) models through the controller (102) for pruning the sensor data at the IoT device node (102). the SVR models performs regression and uses an ϵ error bound of a tube created around the sensor data with a tube width (e) the SVR models are used for defining run-time prediction errors in the SVR models' base attribute and the non-base attribute while predicting values of the attributes in the set of attributes. The predictions are performed in real-time by the system (100).

Furthermore, the controller (106) is configured for comparing the run-time errors for each of the base attributes and the non-base attributes with threshold error values. A transceiver (108) is configured to transmits the model parameters for the attributes or the training data along with the set of attributes from the IoT device node (102) to the data collector node (104).

In an exemplary embodiment, FIG. 1 shows a single controller (106) and the single transceiver (108) configured for the single IoT device node (102). This to be understood the communication network (110) may comprise plurality of IoT device nodes (102) having individual controllers (106) and the transceiver (108). In another embodiment, the plurality of IoT devices (102) may share the controllers (106) and the transceiver (108) amongst other IoT devices (102) in the same communication network. Further, the predictions for the set of attributes are performed using different SVR models. The controller's clock speeds are kept as nominal as 700 MHz and 1.2 GHz to perform a data sampled at 25 Hz and transmitted at 240 fps.

In an exemplary embodiment, the controller (106) may be configured outside the IoT device node (102) for optimizing data transmission in the communication network (110) by means of performing the multivariate data pruning. In another alternate embodiment, the IoT device node (102) may be configured to execute functionalities of the controller (106) while avoiding a requirement of the controller (106) to be configured externally.

Figure 2B:
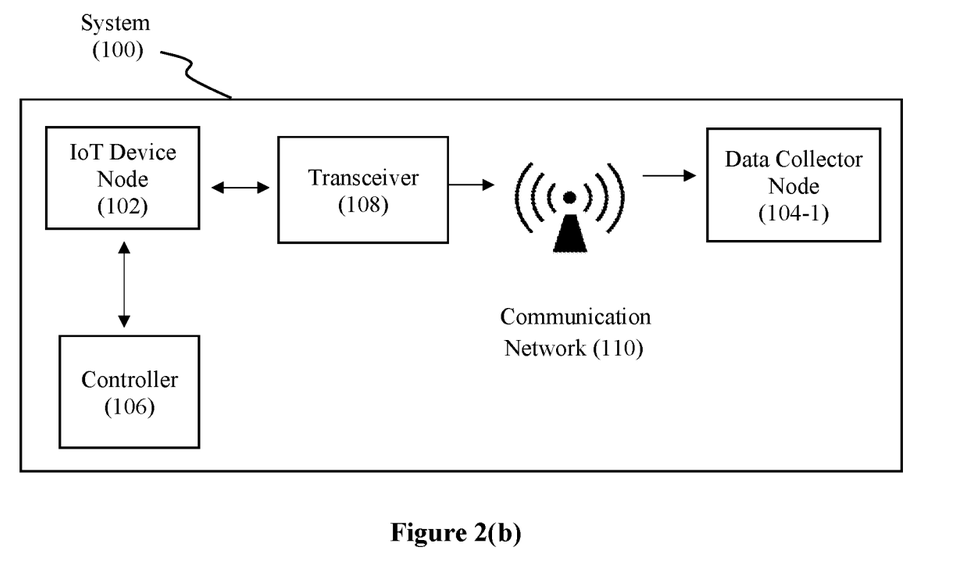
FIG. 2(b) illustrates an experimental set-up for the system shown in FIG. 1 for optimizing data transmission in the communication network, in accordance with different embodiments of the invention.

In accordance with an embodiment, referring to FIG. 2 (*b*), an experimental set-up for the system (100) (may also be referred as a test system) for optimizing data transmission in the communication network is shown. Now referring to FIG. 1 and FIG. 2 (*b*) (in combination), the Internet of Thing (IoT) device node (102) is having sensors for capturing sensor data exchanged between the IoT device node (102) and the data collector node (104) in the communication network. The controller (106) is configured at the IoT device node (102) for constructing the set of attributes through a controller configured at the IoT node (102), from the sensor data, such that each set of attribute comprises the sensor data based on correlation. Each set of attribute comprises a base attribute used for predicting non-base attributes from the set of attributes. The system (100) verifies the attributes and the attributes comprises of 3 phase voltages, 1 neutral voltage, 3 phase currents, 1 neutral current, 1 sequence voltage, 1 sequence current, 3 phases, frequency, and rate of change of frequency (ROCOF).

In an exemplary embodiment, the construction of the set of attributes will now be discussed. Epsilon SVR (SVR model as discussed above) maps the set of attributes (also referred as input features) to a higher-dimensional space and performs regression to find the best fit on the sensor data by creating a tube width (c) around the set of attributes. The epsilon in the epsilon-SVR model specifies an epsilon-tube within which no penalty is associated in a training loss function with the non-base attributes predicted within a distance epsilon from the base attributes. The value of the epsilon determines the width of the tube (the tube width) around the set of attributes; this value of epsilon is tuneable based on the error contingency for that attribute. The non-base attributes that fall inside this tube are considered as correct predictions and are not pruned.

Let $A_i = \{A_i^1, A_i^2, \ldots, A_i^n\}^T$ be the $i^{th}$ sample of n attributes from the sensor data and the system (100) considers estimating l time samples for each of the n attributes measured by the sensor at the IoT device node (102), such that $i \in \{1, \ldots, l\}$ and $v \in \{1, \ldots, n\}$. Then the predictions for the $i^{th}$ sample of these attributes $\hat{A}_i = \{\hat{A}_i^1, \hat{A}_i^2, \ldots, \hat{A}_i^n\}^T$, is expressed as $$\hat{A}_i = \text{diag}\{\omega_{A_i}^T \phi_{A_i}\} + b_i \qquad (1)$$

Where $v = \text{diag}\{M\}$ forms a vector $v$ out of the diagonal elements of the matrix M, $\omega_{A_i}$ and $\Phi_{A_i}$, $i \in \{1, 2, \ldots, l\}$ are given as $$\omega_{A_i}^T = \begin{bmatrix} w_{i-1}^1 & \cdots & w_{i-d_1}^1 & \cdots & 0 \\ w_{i-1}^2 & \cdots\cdots & w_{i-d_2}^2 & \cdots & 0 \\ \vdots & \ddots & \vdots & \ddots & 0 \\ w_{i-1}^n & \cdots\cdots\cdots & w_{i-d_n}^n & \cdots & 0 \end{bmatrix} \qquad (2)$$

$$\Phi_{A_i} = \begin{bmatrix} \phi^1(A_{i-1}^1) & \phi^2(A_{i-1}^2) & \cdots & \phi^n(A_{i-1}^n) \\ \vdots & \vdots & \ddots & \vdots \\ \phi^1(A_{i-d_1}^1) & \phi^2(A_{i-d_1}^2) & \cdots & \phi^n(A_{i-d_1}^n) \\ \vdots & \vdots & \ddots & \vdots \\ 0 & \phi^2(A_{i-d_2}^2) & \cdots & \phi^n(A_{i-d_2}^n) \\ \vdots & \vdots & \ddots & \vdots \\ 0 & 0 & \cdots & \phi^n(A_{i-d_n}^n) \end{bmatrix}$$

are the weight matrix for different attributes and the non-linear mapping from input to higher dimensional feature space for the estimate of $i^{th}$ attribute sample measured by the IoT device node (102).

Further, $w_{i-f}^v$ is the weight of $(i-f)^{th}$ lag value in the auto-regressive model for the $v^{th}$ attribute estimation from the attribute set $A_i$ and $\phi^v(A_{i-f}^v) = \{\phi^v(A_{i-1}^v), \phi^v(A_{i-2}^v), \ldots, \phi^v(A_{i-d_v}^v)\}$ is the feature mapping for the $i^{th}$ sample estimation of the $v^{th}$ element in the attribute set $A_i$. And $f \in \{1, \ldots, d_v\}$, with $d_v$ being the optimum number of lag samples required for estimation of attribute $A^v$ and is based on the variation, importance and tolerance that may be permitted in the estimation of that attribute.

All the rows and columns in $\omega_{A_i}^T$ and $\Phi_{A_i}$ are appropriately zero padded with the number of zeros (noz) appended in them being equal to $noz = d_{max} - d_p$, where $d_p$ is the number of elements in that row or column and $d_{max} = \max\{d_1, d_2, \ldots, d_v\}$.

The values of weights can be obtained by optimizing the problem (3)

$$\mathcal{P}_1: \text{minimize} \left\{ \frac{1}{2} \|w_{A_i^v}\| + Y^v \sum_{i=1}^{l} (\theta_i^v + \theta_i^{*v}) \right\} \qquad (3)$$

$$\text{s.t.} \, \mathcal{C}_1: \; A_i^v - \hat{A}_i^v \leq \epsilon + \xi_i^v$$

$$\mathcal{C}_2: \; \hat{A}_i^v - A_i^v \leq \epsilon + \xi_i^{*v}; \; \xi_i^v, \xi_i^{*v} \geq 0$$

for n values of attributes, where $\omega_{A_i^v}$ is the weight of $d_v$ lag samples used in the estimation of the $i^{th}$ sample for $v^{th}$ attribute in $A_i$, $\theta_i^v$'s are the slack variables ensuring the feasibility of constraints $\mathcal{C}_1$ and $\mathcal{C}_2$, and $Y^v$ is the trade-off factor in the curvature of $\omega_{A_i^v}$ to $\theta_i$ for the $v^{th}$ attribute in $A_i$. Forming the Lagrangian L for (3) using multipliers $\pi_i^v, \pi_i^{*v}, v_i^v, v_i^{*v}$ and taking its partial derivative with respect to $\omega$, $b_i^v$ (offset bias for the $v^{th}$ attribute in $A_i$), $\theta_i^v$ and $\theta_i^{*v}$, the dual problem obtain as, $\mathcal{P}_2$: maximize $$\left\{ -\frac{1}{2} \sum_{i,j=1}^{l} (\pi_i^v - \pi_i^{*v})(\pi_j^v - \pi_j^{*v}) \langle \phi^v(A_i^v), \phi^v(A_j^v) \rangle - \epsilon \sum_{i=1}^{l} (\pi_i^v + \pi_i^{*v}) + \sum_{i=1}^{l} A_i^v (\pi_i^v - \pi_i^{*v}) \right\} \, \text{s.t.} \, \mathcal{C}_4: \sum_{i=1}^{l} (\pi_i^v - \pi_i^{*v}) = 0; \pi_i^v, \pi_i^{*v} \in [0, Y].$$

The inner product $\langle \phi^v(A_i^v), \phi^v(A_j^v) \rangle$ may be replaced with a kernel in input space. Therefore, the attribute estimates can be generalized as $$\hat{A}_i^v = \Sigma_{i,j=1}^l (\pi_i^v - \pi_i^{*v}) K^v(A_i^v, A_j^v) + b_i^v \qquad (4)$$

In this exemplary embodiment a radial basis kernel function is used and the radial basis kernel function is given by, $K^v(A_i^v, A_j^v) = \exp(-\beta \|A_i^v - A_j^v\|)^2 \forall i, j \in \{1, \ldots, l\}$.

Further, the controller (106) is configured for computing a correlation matrix for each attribute pair in the set of attributes. All attributes are stored in the first group and a second group is defined as an empty group. Thereafter, each of the base attribute is shifted in the second group and the non-base attributes are retained in the first group. The shifting is performed iteratively for each attribute in the set of attributes based on repetitive computation of the maximum transfer score. The base attributes to be stored in the first group are identified according to a user defined cross-correlation threshold identified from the correlation matrix. The base attributes comprise attributes with maximum transfer score identified by using the cross-correlation threshold. Based on identification, a set of base attributes for the second group and a set of non-base attributes in the first group is formed.

In another exemplary embodiment, details of set allocation i.e., allocating the base attributes to the second group and retaining the non-base attributes into the first group is further discussed. A disjoint set comprising of various set of attributes obtained from the sensor data is constructed such that each set has attributes that are highly correlated and has one base attribute used for predicting all other attributes in that set.

A set allocation algorithm is emulated to use the correlation matrix, $M_{l \times l}$, which is computed for all the attributes using initial sample that is exchanged between the smart IoT device node (102) and data collector node (104).

Two groups G1 and G2 are formed to segregate the attributes, with all base attributes in set G1 and the remaining non-base attributes in set G2. All attributes are initially kept in set G2 and have two parameters associated with the attributes:

$\rho_i^v$ representing the value of maximum correlation of the $v^{th}$ element in G2 for $i^{th}$ sample estimate with the elements in set G1, and $\delta_i^v$ is the position index of the attribute in set G1, exhibiting maximum correlation with the attribute in set G2. At the beginning, the parameters are set to 0 and −1, since G1 is empty. The cross-correlation threshold, $c_t$ is defined to generate the couple attributes with highest correlation. Using the cross-correlation threshold, the system (100) iterate through G2 and find distance $(d_i^v)$ of $\rho^v$ for $i^{th}$ attribute from $c_t$ defined as, $d_i = \rho_i^v - c_t$. Attributes having $d_i^v < 0$ are the candidate attributes which can be shifted to set G1. A transfer score $(\kappa)$ for each candidate attribute is calculated as $\kappa_i^v = \Sigma_{A_j \in G} 2k \|m_{kj} - \rho_j\|$, where $m_{kj}$ is an element of the matrix $M_{l \times l}$. Therefore, the attribute with the maximum score is shifted to G1. Values of $\rho$ and $v_M$ are then updated for all the attributes in G2. The process of identifying the maximum score and shifting the attributes to the set G1 is repeated till all the attributes in G2 validate $\rho > c_t$. After the formation of groups (the first group and the second group), the system (100) form sets $S_l$, $l \in \{1, 2, \ldots, P\}$, with $P \stackrel{def.}{=} |G1|$. Each attribute of G1 is allotted a different set (the set of base attributes) and each attribute of G2 is added to the set (the set of non-base attributes) corresponding to its position index $\delta_i^v$.

Furthermore, the controller (106) is configured for defining Support Vector Regression (SVR) models for pruning the sensor data at the IoT device node (102). The SVR model comprises an auto-regressive model for the base attribute and a regression model for non-base attribute. An error bound is used for defining run-time prediction errors in the base attributes for the SVR models and the non-base attribute for the SVR model while predicting values of the attributes in the set of attributes. The auto-regressive model for the base attribute uses self-predicted values of the attributes to predict the next values of the attributes, and the regression model (separate regression model) is used for each of the remaining non-attribute and the regression model uses the base attribute for prediction of the other the non-base attributes.

Thereafter, in real time, values for each attribute in the set of attributes are predicted through the controller based on predicted run-time predicted errors in the base attribute and the non-base attribute. The predicted values are used as model parameters and initial samples of the values for each attribute is used as training data for training the SVR models for next predictions of the values of attributes. The initial samples is the optimum number of samples that are to be used for training the SVR model so that the future predictions and current estimations at the receiver node are within a predefined tolerance at the cost of maximum achievable bandwidth saving and least effective retraining counts.

Furthermore, the controller (106) is configured for comparing the run-time errors for each of the base attributes and the non-base attributes with threshold error values. The threshold error values set (or define) predefined tolerance level for each of the base attribute and the non-base attribute.

Further, the controller (106) is configured for identifying the values for each attribute in the set of attributes based on the comparison base attributes with threshold error values. If the run-time error predicted for the SVR model of the base attribute is higher than the threshold error values, the controller (106) retrains the SVR model for the base attributes to obtain a retrained SVR model for each base attribute at the IoT device node (102) and the data collector node (104). The retraining is enabled through good samples from the initial samples predicted by the SVR model and the good samples comprise values of attributes within predefined tolerance level. Thereafter, the run-time errors at the IoT device node (102) in the retrained SVR model is predicted. Further, the run-time errors in the retrained SVR model for the base attributes is identified (by means of lesser or greater). In case the run-time errors in the retrained SVR model for the base attributes is greater than the threshold error values, a new retraining samples of the values of attributes recorded at the IoT device node (102) is transmitted to the data collector node (104). The new retraining samples are used for training each of the SVR models for predicting new values of the attributes.

In an exemplary embodiment, E is the SVR tube width, which is a fixed value for the attribute. However, the run time prediction errors in the base attributes and non-base attributes are defined using $e_B$ and $e_{NB}$ respectively, which are variable quantities. These variables are compared with the per attribute threshold $\varepsilon_{th,v}$. The threshold error $\varepsilon_{th,v}$ is fixed for the attribute (v). Therefore, $\epsilon$ and $\varepsilon_{th,v}$ are predefined and fixed based on the requirement of a particular real-time application such that $\epsilon > \varepsilon_{th,v} \forall v \in \{\text{attribute set}\}$, but $e_{NB}$ and $e_B$ are variables and may take different values as the prediction occurs. These variables may stay within or outside the $\varepsilon_{th,v}$ bound based on if the predictions are still good (i.e., fault free) or faulty, but variables may not fall outside the $\epsilon$ tube boundary.

Furthermore, the transceiver (108) is configured for transmitting one of the model parameters for the attributes or the training data along with the set of attributes from the IoT device node (102) to the data collector node (104). The transmission is performed based on the comparison between the run-time errors for each of the base attributes with the threshold error values. Further, the controller (106) is configured for using a signal-to-interference-plus-noise ratio (SINR) for transmitting the model parameters or the training data for predicting the values for each attributes at the data collector node (104) by the SVR models. The transmitting comprises the transmission of the training data in case the SINR is less than a pre-defined SINR threshold and in case the SINR is greater than a pre-defined SINR threshold.

Furthermore, the controller (106) is configured for identifying the run-time error in the SVR model for the non-base attribute based on the comparison non-base attributes with threshold error values. If the run-time error in the SVR model for the non-base attribute is higher than the threshold error values, then the SVR model for the non-base attributes gets retrained to obtain a retrained SVR model for each non-base attribute at the IoT device node (102) and the data collector node (104).

The retraining of the SVR model for the non-base attributes is enabled through the run time errors predicted by the SVR model for the base attribute when the run-time errors in the SVR model for the base attribute are within the predefined tolerance level. Thereafter, the run-time errors at the IoT device node (102) in the retrained SVR model for the non-base attributes is predicted. Further, the run-time errors in the retrained SVR model for the non-base attributes is identified (by means of lesser or greater). In case the run-time errors in the retrained SVR model for the non-base attributes is greater than the threshold error values, then the correlation matrix gets recomputed and the system (100) checks if the attributes need to be reassigned to one of the set of base attributes or the set of non-base attributes. Furthermore, the attribute shift is updated to a respective set of base attributes or the set of non-base attributes and the SVR models gets retrained through new values of the attributes predicted by each of the SVR model.

Furthermore, a wireless channel state (the SINR—Signal-to-Interference-plus-Noise Ratio) aware relay is used for either retraining data or the model parameters to the IoT device node (102), as the prediction in the base attributes or the non-base attributes cross the pre-defined error threshold. The SINR aware transmission implementation helps in enhancing bandwidth saving in conjuncture with more reliable data reconstruction and prediction at the data collector node (104) in this delay-sensitive framework through noisy wireless channels. Further, the SINR aware transmission implementation helps to prevent any unnecessary data re-transmissions owing to incorrect data packets received due to a wireless channel error. In case, at the retraining instant, the received SINR ($\gamma$) is less than a pre-defined SINR threshold ($\gamma_{th}$), a higher data redundancy is desirable, and thus the system (100) transmits the retraining data. And in case, at the retraining instant, the received SINR ($\gamma$) is greater than the pre-defined SINR threshold ($\gamma_{th}$), then the system (100) transmits the model parameters.

The system (100) uses below disclosed multivariate algorithm (Algorithm 1) involved in dynamic real-time data pruning at the smart IoT device node (102):

Algorithm 1: Dynamic real-time data pruning algorithm at the IoT node (102)

```
Result: Pruned data
n = SVM Model training length
M_{l×l} = Correlation Matrix for l attributes
Initialize set G1 = { }: Empty set
Initialize set G2: Attribute set
ρ_i^v = 0 and δ_i^v = -1 ∀ v ∈ G2
Initialize c_i: Correlation threshold
While d_i^v (∀v ∈ G2) ≤ 0 do
    for v ∈ G2 do
    |   if d_i^v > 0 then
    |   |   Continue
    |   κ_i^v = Σ_{v∈G2} ||m_{vj} - ρ_j||
    |   {G1(v) → G2[·]: ρ_i^v > ρ_j^v ∀i ≠ j}
    |   for each v ∈ G2
    |   |   Update ρ_i^v = max_{v∈G2}{m_{vj}}
    |   |   Update δ_i^v = v ∋ v ∈ G2, m_{vj} = ρ_j
Form sets, S_k, where v ∈ [1,2, ... , P]; P = |G1|
Allot each attribute of G1 to different sets
For   ∀v ∈ G2
    |   Allocate v → S_k ∋ ρ_i^v ∈ S_v
For   Sv; ∀v E {1,2, ... , P}
    |   Define ε-SVR model for base attribute ∈ S_v
    |   Define ε-SVR model for non-base attributes ∈ S_v
    |   Define ε_i^v for each attribute
While True do
    |   Predict value of each attribute
    |   if   Prediction error ∀v < ε_{th,v} then
    |   |   Continue
    |   if   e_B > ε_{th,v}
    |   |   Retrain ε - SVR using good predicted samples
    |   |   Send updated flags to the data collector node (104)
    |   |   if   Error persists then
    |   |   |   Send updated flags at the data collector node (104)
    |   |   |   Retrain ε -SVR using fresh samples
    |   |   |   if   γ > γ_{th} then
    |   |   |   |   Send model parameters to the data collector node (104)
```

```
Algorithm 1: Dynamic real-time data pruning algorithm at the IoT node (102)
|   |   |   else
|   |   |   |   Send fresh sample set to the data collector node (104)
|   if  e_NB > ε_th,v then
|   |   Retrain using good predicted samples
|   |   if  Error persists then
|   |   |   Reform the sets, S_v, for v ∈ {1,2, ... , P}
|   |   |   Send updated flags at DA
|   |   |   if  γ > γ_th then
|   |   |   |   Send sets and model parameters to the data collector node (104)
|   |   |   else
|   |   |   |   Send sets and fresh samples to the data collector node (104)
|   |   |   Retrain ε-SVR using fresh samples
```

Further, the system (100) uses below disclosed real-time reconstruction algorithm (Algorithm 2) at the data collector node (104):

```
Algorithm 2: Real-time reconstruction algorithm
              at the data collector node (104)

Result: Re-constructed data
Receive initial data points from the smart IoT device node (102)
Receive set information and error thresholds
for   Each S_v; ∀v ∈ {1,2, ... , P} do
|   Define ε-SVR model for base attribute ∈ S_v
|   Define ε-SVR models for non-base attributes∈ S_v
while  True do
|   Predict value of each attribute
|   if  Flags received from the smart IoT device (102) then
|   |   if   Self-retraining flag received then
|   |   |   Retrain ε-SVR on good predicted samples
|   |   if  Data or model parameters received then
|   |   |   if   For base attribute then
|   |   |   |   Retrain respective model
|   |   |   if  For non-base attribute then
|   |   |   |   Update sets
|   |   |   |   Retrain respective model
```

In an exemplary embodiment, the system (100) is implemented and validated on the real-time data measured by a PMU (IoT device node (102)) installed at a Main Switchboard (MSB) substation, reporting the data over a wireless channel to the system (100) within a radius of 1 km, behaving as a local PDC (data collector node (104)). The IoT device node (102) is connected to an incomer bay of the 11 kV/440 V, 50 Hz substation with maximum load current rating of 600 A. The IoT device node (102) in its default configuration without the installation of the pruning framework reported data at 25 Hz. The performance of the Algorithm 1 is compared to a N single-variate data compression scenario for a closest fit.

Further, for performance analysis of the algorithms (1 and 2), following indices are defined:

Effective retraining Count ($\eta$): An effective retraining count is the number of times the SVM model is retrained to keep the prediction error bounded by the predefined tolerance level ($\varepsilon_{th}$). The same percentage of the predefined tolerance level ($\varepsilon_{th}$) is used for all the attributes. The effective retraining count ($\eta$) is used for analyzing the run-time complexity of the multivariate data pruning algorithm over the state-of-the-art. Mathematically represented as, $$\eta = \frac{\sum_{v=1}^{N} t_v RC_v}{\sum_{v=1}^{N} t_v}$$

where $t_v$ is the training time of the $v^{th}$ attribute and $RC_v$ is the total retraining suffered by the attribute.

Normalized root mean square error (NRMSE): The NRMSE for the $v^{th}$ attribute in $\varepsilon_v = A_i^v - \hat{A}_i^v$ for the algorithm 1 is defined as $$NRMSE = \frac{\sum_{v=1}^{N} \|\varepsilon_v / \sqrt{l}\|}{N}$$

Bandwidth saving: The bandwidth saving is defined as the percentage of an actual data that is not transmitted and is predicted within a predefined tolerance $\varepsilon$ constrained by the SVR tube.

Optimum training length (OTL): The Optimum training length is defined as the training length that captures maximum data variations rendering optimum bandwidth saving for the IoT device node (102) to the data collector node (104) over the wireless data communication.

Trade-off gain factor (Gγ): The trade-off factor as defined in equation (3), captures the leverage permitted in incorrect reception or estimation of the model parameters against the prediction error suffered by the SVR model. The trade-off gain factor (Gγ) therefore captures the dB change of the parameter from its optimal. If $Y_{opt}^v$ is the optimal trade-off factor corresponding to maximum bandwidth saving for an attribute with trade-off factor $Y^v$, Gγ is defined as $$G_Y = 10 \times \log\left(\frac{Y^v}{Y_{opt}^v}\right).$$

The average tradeoff gain factor can therefore be defined as, $$\langle G_Y \rangle = \frac{1}{N} \sum_{i=1}^{N} 10 \times \log_{10}\left(\frac{Y_i}{Y_i^{opt}}\right).$$

Figure 3A:
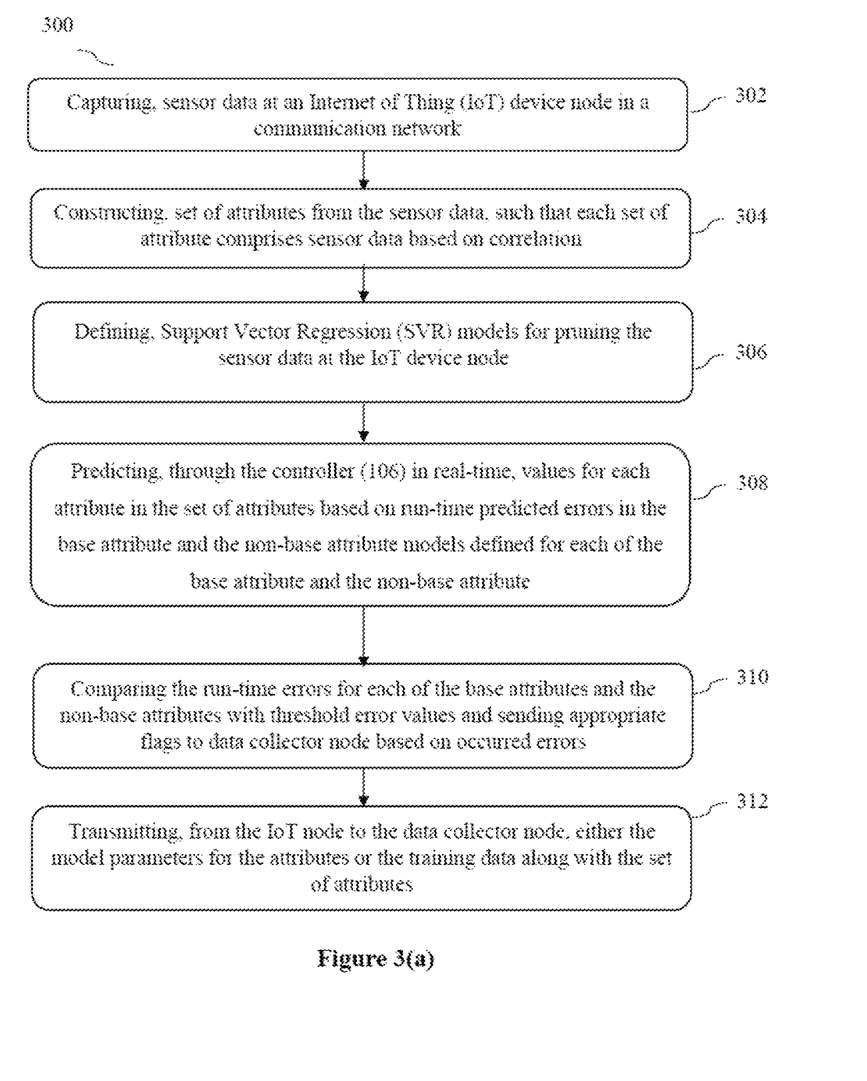
FIG. 3(a) illustrates a method for optimizing data transmission in the communication network, in accordance with an embodiment of the invention.

In accordance with an embodiment, referring to FIG. 3(a), the method (300) for optimizing data transmission in the communication network is illustrated. The method (300) may be executed in the system (100) as discussed above. At step (302), the Internet of Thing (IoT) device node (102) in the communication network captures the sensor data and the sensor data is exchanged between the IoT device node (102) and a data collector node (104).

At step (304): The set of attributes from the sensor data is constructed through a controller configured at the IoT node (102), such that each set of attribute comprises sensor data based on correlation and the each set of attribute comprises a base attribute used for predicting non-base attributes from the set of attributes.

At step (306): The Support Vector Regression (SVR) models are defined for pruning the sensor data at the IoT device node (102) and the error bound of a tube width (e) is used for defining run-time prediction errors in the SVR models' base attribute and non-base attribute while predicting values of the attributes in the set of attributes.

At step (308): In real time, values for each attribute in the set of attributes are predicted based on predicted through the controller (106) run-time predicted errors in the base attribute and the non-base attribute. The predicted values are used as model parameters and initial samples of the values for each attribute is used as training data for training the SVR models for next predictions of the values of attributes.

At step (310): The run-time errors for each of the base attributes and the non-base attributes are compared with threshold error values and appropriate flags based on occurred errors are sent to the data collector node (104). The threshold error values set predefined tolerance level for each of the base attribute and the non-base attribute.

At step (312): The model parameters for the attributes or the training data along with the set of attributes gets transferred from the IoT device node (102) to the data collector node (104). The transmitting is performed based on the comparison.

Figure 3B:
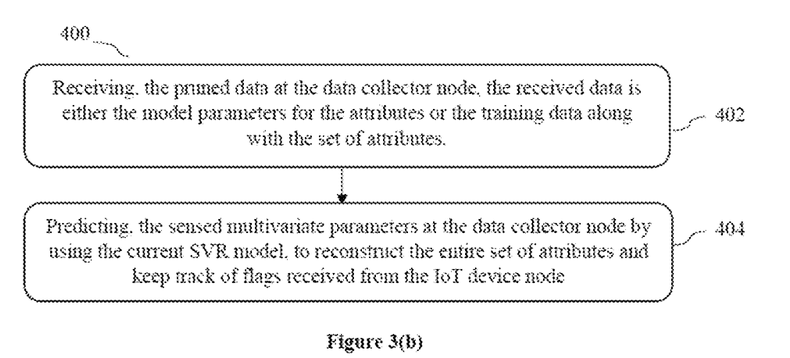
FIG. 3(b) illustrates a method of real-time reconstruction at the data collector node, in accordance with an embodiment of the invention.

In accordance with an embodiment, referring to FIG. 3(b) the method (400) of real-time reconstruction at the data collector node (104) is illustrated. At step (402): The data collector node (104) receives the pruned data, the received data is either the model parameters for the attributes or the training data along with the set of attributes.

At step (404): The data collector node (104) predicts the sensed multivariate parameters at the data collector node (104) by using the current SVR model, to reconstruct the entire set of attributes. The data collector node also keeps a track of the flags raised by the IoT data node based on error comparison at that end.

Description of the method (400) is similar to the description of the system (100) as detailed above and hence is not repeated for the sake of brevity.

EXPERIMENTAL RESULTS

Figure 4A:
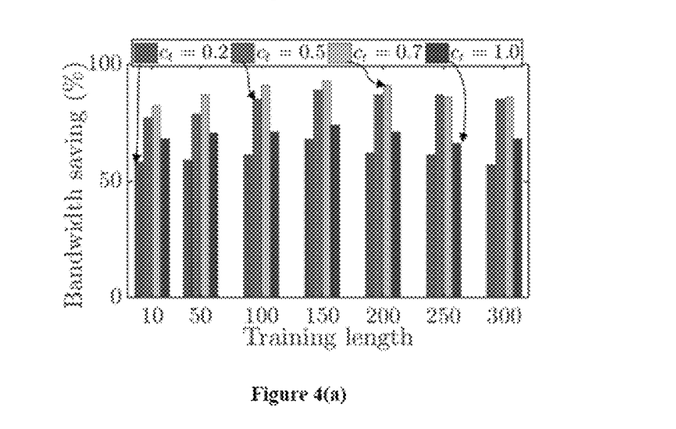
FIG. 4(a) illustrates a graphical representation of bandwidth saving versus training length observed for the system of FIG. 1, in accordance with different embodiments of the invention.
Figure 4B:
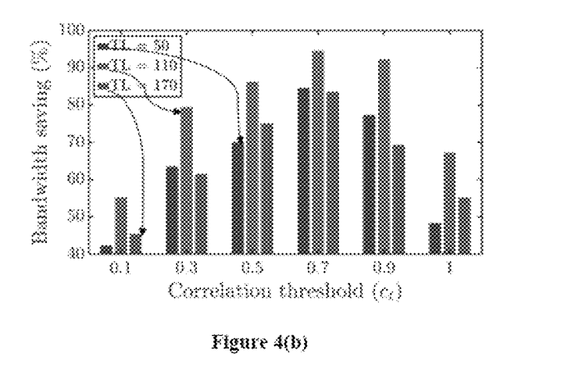
FIG. 4(b) illustrates a graphical representation of bandwidth saving versus correlation threshold observed for the system of FIG. 1, in accordance with different embodiments of the invention.

The multivariate dynamic real-time data-pruning algorithm used by the system (100) (also referred as the test system) generates the experimental results are described below:

Determining Optimal Hyper-Parameters:

The correlation threshold $C_t$ corresponding to the maximum bandwidth saving is used as its optimum value. FIG. 4 (a) illustrates a graphical representation of bandwidth saving versus training length. FIG. 4(b) illustrates a graphical representation of bandwidth saving versus correlation threshold. From FIG. 4(b), case-1: the maximum bandwidth saving is achieved when $C_t$ is set to 0.7 under optimal considerations of other parameters used in the algorithm. The $C_t$ value of 1 corresponds to the where no set formation happens, and each attribute is therefore the base attribute for the IoT device node (102) data. The cross-correlation between the attributes is hence not exploited in this case-1, which is analogous to a N single-variate data compression algorithm, and therefore this case gives a valuable insight into the validity as well as strength of the algorithm in pruning the highly sensitive power systems' data. The Table 1 shows the values of the hyper-parameters used in the validation of the algorithm 1 and the performance indices obtained as a by-product. The multivariate algorithm 1 is able to achieve optimal bandwidth saving at an optimal training length of 150 and 110 when transmitting model parameters and retraining data respectively. The optimal values of trade-off factors ($Y^v$) are determined through simulation and are set to their optimal as mentioned in Table 1.

TABLE 1

Performance indices and parameters for experimental setup of the system (100) shown in FIG. 2

| Parameter | | Value |
|---|---|---|
| Tube width ($\epsilon$) | | $10^{-3}$% |
| Tolerance ($\epsilon_{th}$) | | $10^{-1}$% |
| Correlation threshold ($c_t$) | | 0.7% |
| Optimal training length | Model parameters | 150 |
| | Retraining data | 110 |
| Lag (d) | | 5 |
| Normalized root-mean-square-error (NRMSE) | | $4.34 \times 10^{-5}$% |
| Extra bandwidth saving | Model parameters | 25.68% |
| (from state-of-the-art) | Retraining data | 42% |
| Extra retraining count saving | Model parameters | 29.29% |
| (from state-of-the-art) | Retraining data | 42% |
| Trade-off factor ($Y^v$) | Phase A voltage ($V_{A,non\text{-}base}$) | $10^{-1}$ |
| | Phase B voltage ($V_{B,base}$) | $10^{-3}$ |
| | Phase A current ($I_{A,non\text{-}base}$) | $10^{-1}$ |
| | Phase B current ($I_{B,base}$) | $10^{-4}$ |
| | Frequency ($f_{base}$) | $10^3$ |

The optimum training length obtained in the case-1 where only model parameters are transmitted is greater than the one observed in case when retraining data is sent. This is in line with the fact that model parameter transmission is more prone to wireless channel errors owing to less data redundancy as opposed to retraining data. It is also observed from Table 1 that this higher channel error susceptibility in case of model parameters leads to a higher retraining frequency thus, decreasing the extra bandwidth and retraining count saving.

Figure 5:
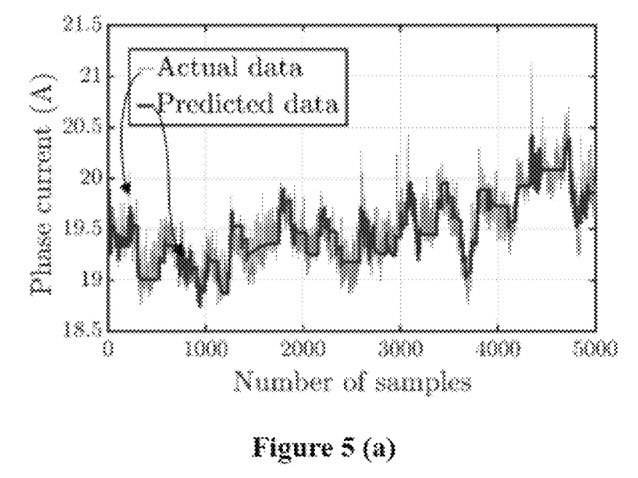
FIG. 5(a) illustrates a graphical representation of phase current reconstruction versus number of samples observed for the system of FIG. 1, in accordance with different embodiments of the invention.
FIG. 5(b) illustrates a graphical representation of phase voltage reconstruction versus number of samples observed for the system of FIG. 1, in accordance with different embodiments of the invention.
FIG. 5(c) illustrates a graphical representation of frequency reconstruction versus number of samples observed for the system of FIG. 1, in accordance with different embodiments of the invention.

Performance of Multivariate Dynamic Real-Time Data Pruning Algorithm:

FIG. 5 (a) illustrates a graphical representation of phase current versus number of samples. It is observed that the actual current samples in FIG. 5(a) (plotted with fat line), and further it is observed that the small spikes in the data. The spikes last for only one or two samples within 5% of nominal value, accounting for only ~0.04-0.08 seconds, at the IoT devices node (102) default reporting rate (25 Hz).

Figure 5C:
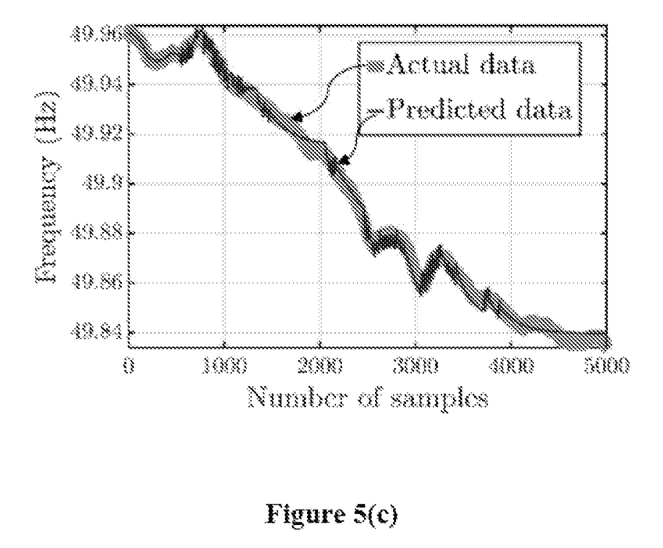

By definition, the spikes may not be considered to constitute a fault, owing to a very small power in these impulses. Moreover, the spikes dying quickly do not change the attribute average till the instant, rendering retraining the model unnecessary at such instances. The same inference is drawn for the zoomed region c-1 in FIG. 5(b). FIG. 5(c) illustrates a graphical representation of frequency versus number of samples.

Figure 6:
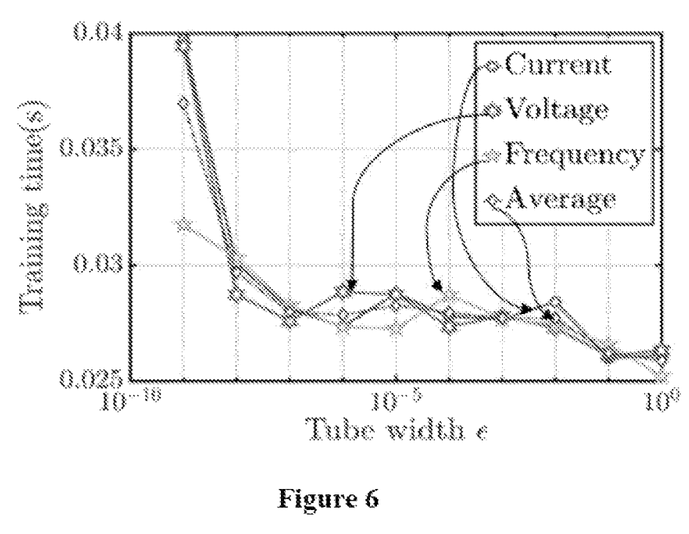
FIG. 6 illustrates a graphical representation of training time versus tube width observed for the system of FIG. 1, in accordance with different embodiments of the invention.

The algorithm 1 runs on a Broadcom BCM2837 64-bit quad core processor used as the controller (106). FIG. 6 illustrates a graphical representation of training time versus tube width. The plot in FIG. 6 shows the training time for various attributes measured by the IoT device node (102). It is inferred from the plot that the training time for all tolerance values stays below 0.04 seconds, which is less than the reporting rate (25 Hz) used by the IoT device nodes (102) and therefore is a real-time data pruning at the IoT device node (102) and the data collector node (102) end. Further, it is infer that the algorithm performs better than the N-single variate real-time data compression algorithm (conventional).

Further, again referring to FIG. 4, the system (100) is able to achieve a bandwidth saving of 93% when transmitting machine learning model parameters (by using the SVM models), and 94.45% when transmitting retraining data, which are respectively ~25.68% and 40% better than the conventional methods.

Figure 7:
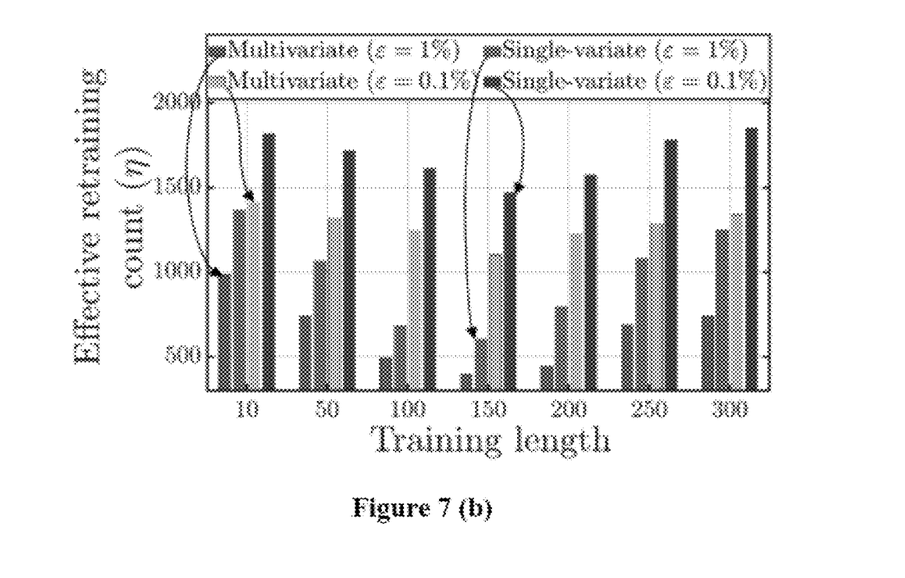
Figure 7A:
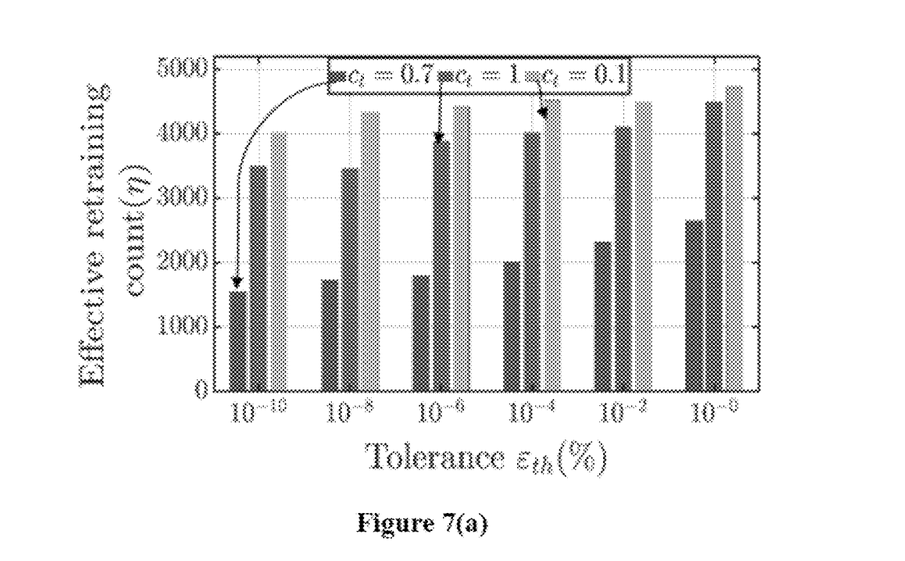

FIG. 7(a) illustrates a graphical representation of effective retraining versus tolerance. FIG. 7(b) illustrates a graphical representation of effective retraining versus training length. From FIG. 7(a) and FIG. 7(b), it is concluded that the system (100) and method (300) reduces the effective retraining count by 28% and 42% while choosing to transmit the model parameters and retraining data respectively. The algorithm is applied to the window-averaged data, which takes the average of the last 20-25 samples to smoothen the estimated curve. This reduces the effective retraining count significantly as shown in FIGS. 7(a) and 7(b) while ensuring no exclusion of any critical retraining and aiding real-time processing constraints for the setup.

Figure 8:
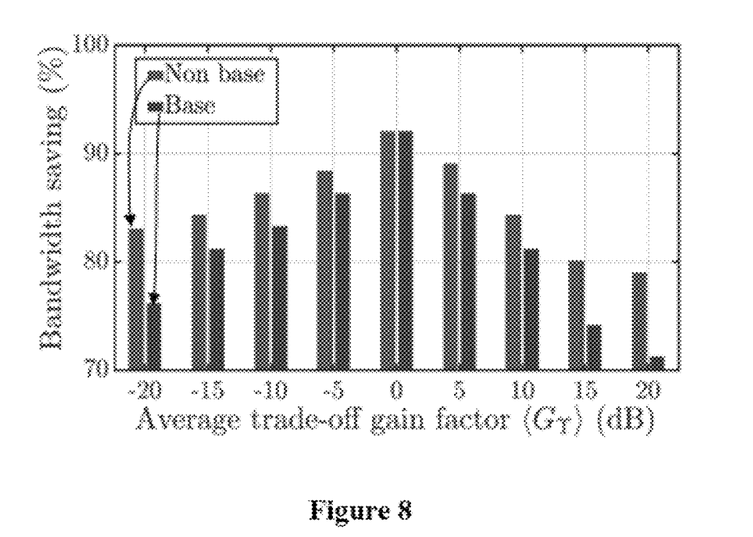
FIG. 8 illustrates a graphical representation of bandwidth saving versus average trade—off gain factor observed for the system of FIG. 1, in accordance with different embodiments of the invention.

FIG. 8 illustrates a graphical representation of bandwidth saving versus average trade—off gain factor. The FIG. 8 shows the variation of bandwidth saving with average trade-off gain factor, it is concluded that for same drop (in dB) in average trade-off gain factor for the base and the non-base attributes, the base attributes tend to impact the bandwidth saving at a steeper rate opposed to the non-base attributes. This observation stems from the ability of base attributes to aid the prediction of the non-base attribute, and the error in the base attributes affects the strength of the complete algorithm. Therefore, any imperfection in the base attribute calculation at the receiver end must always be strictly penalized.

Further, again referring to FIG. 2 (b), in which the experimental setup for the system (100) is shown, due to the heavy inertia, disturbance damping and solid grounding of electrical power systems, sudden high-value spikes for a fault constituting time is difficult to occur, and therefore averaging over one cycle is always an efficient way of data pruning.

Exemplary embodiments discussed above may provide certain advantages. Though not required to practice aspects of the disclosure, the advantages may include those provided by the following features.

Some embodiment of the system (100) and the method (300) may not add to the delay budget of the real-time wireless communication by transmitting the actual data samples for each attribute while grouping, regrouping, training or retraining is done at the IoT device node (102).

Some embodiment of the system (100) and the method (300) transmits only base attributes significantly reduces the dimensionality of the multi attribute data set aiding bandwidth saving.

Some embodiments of the system (100) and the method (300) provides reduced effective retraining count by the virtue of exploiting cross correlation within the data sets makes the system (100) and the method (300) efficiently suited for real-time applications.

Some embodiment of the system (100) and the method (300), the aspect of cross correlation usage also allows the predictions to be highly precise, and therefore the system (100) and the method (300) becomes less prone to reconstruction errors.

The invention claimed is:

1. A method for optimizing data transmission in a communication network, the method comprising:
    capturing sensor data at an Internet of Thing (IoT) device node in the communication network, wherein the sensor data is exchanged between the IoT device node and a data collector node;
    constructing, through a controller configured at the IoT node, a set of attributes from the sensor data, each attribute comprises sensor data based on correlation, wherein each attribute comprises a base attribute used for predicting non-base attributes from the set of attributes;
    defining, through the controller, Support Vector Regression (SVR) models for pruning the sensor data at the IoT device node, wherein the SVR models performs regression and uses an error bound of a tube created around the sensor data with a tube width ($\varepsilon$) for defining run-time predicted errors in the base attribute and the non-base attributes while predicting values of the attributes in the set of attributes;
    predicting, through the controller in real-time, values for each attribute in the set of attributes based on run-time predicted errors in the base attribute and the non-base attributes, wherein predicted values are used as model parameters and initial samples of the values for each attribute is used as training data for training the SVR models for next predictions of the values of attributes;
    comparing, through the controller, the run-time errors for the base attributes and the non-base attributes with threshold error values, wherein the threshold error values set predefined tolerance level for s; and
    transmitting, from the IoT device node to the data collector node, model parameters for the attributes or the training data along with the set of attributes, wherein the transmitting is performed based on the comparison.

2. The method as claimed in claim 1, wherein the constructing comprises:
    computing, a correlation matrix for each attribute pair in the set of attributes, wherein all attributes are stored in a first group and a second group is defined as an empty group; and
    shifting, each of the base attributes in the second group and retaining the non-base attributes in the first group, wherein the base attributes to be stored in the first group are identified according to a user defined cross-correlation threshold identified from the correlation matrix, wherein the base attributes comprise attributes with maximum transfer score identified by using the cross-correlation threshold,
    wherein shifting is performed iteratively for each attribute in the set of attributes based on repetitive computation of the maximum transfer score; and
    forming a set of base attributes for the second group and a set of non-base attributes in the first group.

3. The method as claimed in claim 1, wherein the SVR model comprises an auto-regressive model for the base attribute and a regression model for non-base attribute.

4. The method as claimed in claim 1, wherein the comparing comprises:
    identifying, based on the comparing, if the run-time error predicted for the SVR model of the base attribute is higher than the threshold error values;

retraining the SVR model for the base attributes to obtain a retrained SVR model for each base attribute at the IoT device node and the data collector node, wherein the retraining is enabled through good samples from the initial samples predicted by the SVR model, wherein the good samples comprise values of attributes within predefined tolerance level;

predicting the run-time errors at the IoT device node in the retrained SVR model;

identifying in case the run-time errors in the retrained SVR model for the base attributes is greater than the threshold error values; and transmitting, new retraining samples of the values of attributes recorded at the IoT node to the data collector node, wherein the new retraining samples are used for training each of the SVR models for predicting new values of the attributes.

5. The method as claimed in claim 1, comprising:

using, a signal-to-interference-plus-noise ratio (SINR), for transmitting the model parameters or the training data for predicting the values for each attribute in the set of attributes at the data collector node by the SVR models, wherein the transmitting comprises:

transmitting the training data in case the SINR is less than a pre-defined SINR threshold; and transmitting the model parameters in case the SINR is greater than a pre-defined SINR threshold.

6. The method as claimed in claim 1, wherein the comparing comprises:

identifying, based on the comparing, if the run-time error in the SVR model for the non-base attributes is higher than the threshold error values;

retraining the SVR model for the non-base attributes to obtain a retrained SVR model for each non-base attribute at the IoT device node and the data collector node, wherein the retraining is enabled through the run time errors in the SVR model for the base attribute when the run-time errors in the SVR model for the base attribute are within the predefined tolerance level;

predicting the run-time errors at the IoT device node in the retrained SVR model for the non-base;

identifying in case the run-time errors in the retrained SVR model for the non-base attributes is greater than the threshold error values; and recomputing, the correlation matrix and checking if the attributes need to be reassigned to one of the set of base attributes or the set of non-base attributes;

updating the attribute shift to a respective set of base attributes or the set of non-base attributes; and retraining the SVR models through new values of the attributes predicted by each of the SVR model.

7. The method as claimed in claim 1, comprising verifying the attribute, wherein the attribute comprises of phase voltages, phase currents, sequence voltage, sequence current, phases, frequency, and rate of change of frequency (ROCOF).

8. A system for optimizing data transmission in a communication network, the system comprising:

an Internet of Thing (IoT) device node having sensors for capturing sensor data, wherein the sensor data is exchanged between the IoT device node and a data collector node in the communication network;

a controller at the IoT device node:

constructs set of attributes from the sensor data, each attribute comprises sensor data based on correlation, wherein each attribute comprises a base attribute used for predicting non-base attributes from the set of attributes;

defines Support Vector Regression (SVR) models for pruning the sensor data at the IoT device node, wherein the SVR models performs regression and uses an error bound of a tube created around the sensor data with a tube width ($\varepsilon$) for limiting run-time predicted errors in the base attribute and the non-base attributes while predicting values of the attributes in the set of attributes;

predicts in real-time, values for each attribute in the set of attributes on run-time predicted errors in the base attribute and the non-base attributes, wherein predicted values are used as model parameters and initial samples of the values for each attribute is used as training data for training the SVR models for next predictions of the values of attributes;

compares the run-time errors for the base attributes and the non-base attributes with threshold error values, wherein the threshold error values set predefined tolerance level for each of the base attribute and the non-base attributes; and a transceiver that:

transmits, from the IoT device node to the data collector node, either the model parameters for the attributes or the training data along with the set of attributes, wherein the transmitting is performed based on the comparison.

9. The system as claimed in claim 8, wherein the controller:

computes, a correlation matrix for each attribute pair in the set of attributes, wherein all attributes are stored in a f first group and a second group is defined as an empty group; and shifts, each of the base attributes in the second group and retains the non-base attributes in the first group, wherein the base attributes to be stored in the first group are identified according to a user defined cross-correlation threshold identified from the correlation matrix, wherein the base attributes comprise attributes with maximum transfer score identified by using the cross-correlation threshold, wherein shifting is performed iteratively for each attribute in the set of attributes based on repetitive computation of the maximum transfer score; and forms a set of base attributes for the second group and a set of non-base attributes in the first group.

10. The system as claimed in claim 8, wherein the SVR model comprises an auto-regressive model for the base attribute and a regression model for non-base attribute.

11. The system as claimed in claim 8, wherein the controller:

identifies, based on the comparing, if the run-time error predicted for the SVR model of the base attribute is higher than the threshold error values;

retrains the SVR model for the base attributes to obtain a retrained SVR model for each base attribute at the IoT device node and the data collector node, wherein the retraining is enabled through good samples from the initial samples predicted by the SVR model, wherein the good samples comprise values of attributes within predefined tolerance level;

predicts the run-time errors at the IoT device node in the retrained SVR model;

identifies in case the run-time errors in the retrained SVR model for the base attributes is greater than the threshold error values; and transmits, new retraining samples of the values of attributes recorded at the IoT device node to the data collector node, wherein the new retraining samples are used for training each of the SVR models for predicting new values of the attributes.

12. The system as claimed in claim 8, wherein the controller:

identifies, based on the comparing, if the run-time error in the SVR model for the non-base attributes is higher than the threshold error values;

retrains the SVR model for the non-base attributes to obtain a retrained SVR model for each non-base attribute at the IoT device node and the data collector node, wherein the retraining is enabled through the run time errors predicted by the SVR model for the base attribute when the run-time errors in the SVR model for the base attribute are within the predefined tolerance level;

predicts the run-time errors at the IoT device node in the retrained SVR model for the non-base;

identifies in case the run-time errors in the retrained SVR model for the non-base attributes is greater than the threshold error values;

recomputes, the correlation matrix and checking if the attributes need to be reassigned to one of the set of base attributes or the set of non-base attributes;

updates the attribute shift to a respective set of base attributes or the set of non-base attributes; and retrains the SVR models through new values of the attributes predicted by each of the SVR model.

13. The system as claimed in claim 8, wherein the controller:

uses, a signal-to-interference-plus-noise ratio (SINR), for transmitting the model parameters or the training data predicting the values for each attribute in the set of attributes at the data collector node by the SVR models, wherein the transmitting comprises:

transmits the training data in case the SINR is less than a pre-defined SINR threshold; and transmits the model parameters in case the SINR is greater than a pre-defined SINR threshold.

14. The system as claimed in claim 8, wherein the system is verified on the attribute set comprising of phase voltages, phase currents, sequence voltage, sequence current, phases, frequency, and rate of change of frequency (ROCOF).

* * * * *